United States Patent
Kraemer et al.

(10) Patent No.: US 11,536,274 B2
(45) Date of Patent: Dec. 27, 2022

(54) ARRANGEMENT FOR RECEIVING THE AXIAL THRUST OF A CENTRIFUGAL PUMP

(71) Applicant: KSB SE & Co. KGaA, Frankenthal (DE)

(72) Inventors: Ralph Kraemer, Frankenthal (DE); Kai Molitor, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 102 days.

(21) Appl. No.: 17/257,507

(22) PCT Filed: Jul. 2, 2019

(86) PCT No.: PCT/EP2019/067697
§ 371 (c)(1),
(2) Date: Dec. 31, 2020

(87) PCT Pub. No.: WO2020/007838
PCT Pub. Date: Jan. 9, 2020

(65) Prior Publication Data
US 2021/0180600 A1  Jun. 17, 2021

(30) Foreign Application Priority Data
Jul. 2, 2018  (DE) .................... 10 2018 210 842.0

(51) Int. Cl.
*F04D 15/00* (2006.01)
*F04D 1/06* (2006.01)
(Continued)

(52) U.S. Cl.
CPC ........... *F04D 1/06* (2013.01); *F04D 15/0088* (2013.01); *F04D 29/041* (2013.01);
(Continued)

(58) Field of Classification Search
CPC .... F04D 29/05; F04D 29/041; F05D 2240/52; F16C 17/04; F16C 17/246; F16C 2233/00; G01L 5/12; G01M 13/005; G01M 13/04
See application file for complete search history.

(56) References Cited

U.S. PATENT DOCUMENTS

| 4,145,919 A | * | 3/1979 | Bauer | ................... | G01M 13/04 |
| | | | | | 73/862.49 |
| 4,161,877 A | * | 7/1979 | Bauer | ....................... | G01L 5/12 |
| | | | | | 73/593 |

(Continued)

FOREIGN PATENT DOCUMENTS

| CN | 103776573 | * | 5/2014 | ............... | G01L 5/00 |
| CN | 103776573 A | | 5/2014 | | |

(Continued)

OTHER PUBLICATIONS

International Search Report (PCT/ISA/210) issued in PCT Application No. PCT/EP2019/067697 dated Oct. 2, 2019 with English translation (six (6) pages).

(Continued)

*Primary Examiner* — Christopher Verdier
*Assistant Examiner* — Andrew J Marien
(74) *Attorney, Agent, or Firm* — Crowell & Moring LLP

(57) ABSTRACT

An arrangement for monitoring a centrifugal pump is provided. receiving the residual axial thrust of a centrifugal pump. The arrangement includes a load-relieving device configured to receive the residual axial thrust developed during pump operation, an axial bearing, and a sensor ring is associated with the axial bearing. The ring (10) is divided into segments having sensors at the segment dividing regions.

8 Claims, 5 Drawing Sheets

Figure 1:
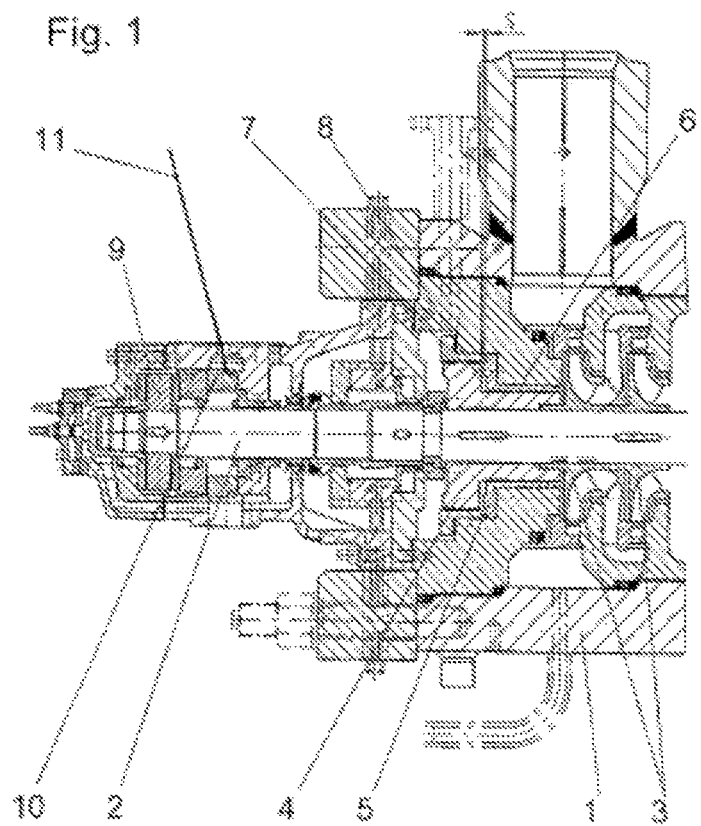

(51) Int. Cl.
   *F04D 29/041* (2006.01)
   *F16C 17/04* (2006.01)
   *F16C 17/24* (2006.01)

(52) U.S. Cl.
   CPC .......... *F04D 29/0413* (2013.01); *F16C 17/04* (2013.01); *F16C 17/246* (2013.01); *F05D 2240/52* (2013.01); *F16C 2233/00* (2013.01)

(56) References Cited

U.S. PATENT DOCUMENTS

| | | | | |
|---|---|---|---|---|
| 10,557,497 | B1* | 2/2020 | Jones | F16C 41/00 |
| 2002/0114713 | A1 | 8/2002 | Wang et al. | |
| 2004/0151581 | A1* | 8/2004 | Hellmann | F04D 15/0088 |
| | | | | 415/118 |
| 2006/0243068 | A1* | 11/2006 | Ueno | F16C 19/522 |
| | | | | 73/862.322 |
| 2015/0247778 | A1* | 9/2015 | Haschke | G01M 5/0083 |
| | | | | 73/801 |

FOREIGN PATENT DOCUMENTS

| | | |
|---|---|---|
| DE | 43 41 315 A1 | 6/1995 |
| DE | 199 27 135 A1 | 12/2000 |
| EP | 1 185 795 B1 | 7/2003 |
| EP | 1 422 424 A2 | 5/2004 |
| JP | 2012-42416 A | 3/2012 |
| WO | WO 00/77405 A1 | 12/2000 |

OTHER PUBLICATIONS

German-language Written Opinion (PCT/ISA/237) issued in PCT Application No. PCT/EP2019/067697 dated Oct. 2, 2019 (six (6) pages).

Cover page of EP 1 185 795 A1 published on Mar. 13, 2002 (one (1) page).

Hindi-language Office Action issued in Indian Application No. 2020037053975 dated Jul. 20, 2022 with English translation (five (5) pages).

* cited by examiner

ARRANGEMENT FOR RECEIVING THE AXIAL THRUST OF A CENTRIFUGAL PUMP

This application is a national phase of PCT International Application No. PCT/EP2019/067697, filed Jul. 2, 2019, which claims priority under 35 U.S.C. § 119 from German Patent Application No. 10 2018 210 842.0, filed Jul. 2, 2018, the entire disclosures of which are herein expressly incorporated by reference.

The invention relates to an arrangement for absorbing the axial thrust of a centrifugal pump, having a relief device and an axial bearing, wherein a ring is assigned to the axial bearing.

The axial thrust is the resultant of all the axial forces acting on the pump rotor. In multistage centrifugal pumps, for example, there are essentially three types of relief devices for absorbing the axial thrust: relief disk, relief piston and stepped piston. The last-mentioned is, in the form predominantly in use, designed as a double piston.

What is common to all three versions is a relief stream guided via gaps. The relief stream, which is normally guided back to the inlet of the centrifugal pump, constitutes a leakage loss, which is attempted to be minimized by way of gap widths which are as small as possible. Here, however, it has to be ensured that, under all operating conditions, rubbing of the moving parts against the stationary parts of the centrifugal pump is avoided. Rubbing of the pump rotor against the casing can lead to failure of the centrifugal pump.

For early detection of faults in centrifugal pumps, use may be made of sensors which detect and transmit to a monitoring unit standard-deviating vibrations, heat build-up, noises or other measurable variables. Such sensors are normally arranged on the outside of the pump casing.

A significant fault in the interior of the centrifugal pump occurs if bearings are subjected to wear or if a relief device works only to an insufficient extent. Such a fault may be realized in a gradual manner. In this regard, it may, during its initial stages, remain without symptoms detectable on the outer casing of the centrifugal pump, and actually be detected by sensors only after occurrence of considerable damage and possible failure of the centrifugal pump.

It is known to determine axial forces with the aid of an axially contacting sensor, which is also referred to as a load cell. From design aspects, however, such a load cell cannot be used permanently.

EP 1 422 424 A2 describes a method and a device for early detection of faults in a centrifugal pump equipped with a relief device. Here, use is made of a spring element which is in the form of a cardanic ring. Said ring is dimensioned in such a way that it is deformed by the residual axial force.

A relief device equipped with the stated elements is known from EP 1 185 795 B1. This describes an arrangement for absorbing the axial thrust of a multistage centrifugal pump, which arrangement has a relief device. The relief device is designed in such a way that, in all the operating states, a residual thrust acting in the direction of the suction side of the pump occurs. Use is made of a cardanic ring which is dimensioned in such a way that it is deformed elastically by the residual thrust. The spring constant of the cardanic ring is such that, starting from a maximum gap width in the rest state of the pump, the axial gap is closed under operating conditions to a minimum width at which contact between the surfaces delimiting the axial gap is just still avoided.

The measurement devices used in conventional arrangements for absorbing the axial thrust require a relatively large structural height. For the measurement of mechanical forces, the force must be directed via a measurement point as accurately as possible. Said force causes a deformation of the measurement point. For a suitable geometry, the deformation of the measurement point is proportional to the active force.

With the aid of sensors, for example strain gages, said deformation can be measured and evaluated. The measurement body must be designed in such a way that the deformations brought about are still within the elastic range of the measurement body material. The prior art has disclosed measurement body geometries which are in the form of a ring having, on a face side, projections for introducing or dissipating forces. The measurement body height is a decisive factor for the stiffness of the ring. The measurement body height occurs as a third power in the second moment of area. The stiffness of the measurement body is in turn decisive for the maximum force to be transmitted. If the structural space of the pump is limited in terms of height and the measuring force is large, conventional measurement devices cannot be used. The devices, for example in the form of a ring, would be overloaded.

It is an object of the invention to specify an arrangement for absorbing the axial thrust of a centrifugal pump with which possible faults can be detected reliably and at an early stage. In this case, the arrangement is intended to be usable with a smallest possible structural space, so that a compact design is possible. The arrangement is intended to be distinguished by high reliability with the absorption of the axial thrust and to produce the lowest possible leakage losses, so that the relief streams are as small as possible. Moreover, the construction is intended to be characterized by a high service life and the lowest possible production costs. The arrangement is furthermore intended to be as easily accessible as possible for maintenance tasks. The arrangement is furthermore intended to be easy to mount and to ensure a means of production which is as inexpensive as possible.

According to the invention, said object is achieved by an arrangement having the features of claim 1. Preferred variants emerge from the dependent claims, the description and the drawings.

According to the invention, the ring assigned to the axial bearing has multiple segments. Here, the ring is divided into at least two segments, preferably three segments, and in particular more than three segments. It proves to be particularly expedient if the ring is divided into fewer than nine segments, preferably fewer than seven segments, in particular fewer than six segments. In a particularly expedient embodiment of the invention, the ring is divided into five segments. The ring may be divided into an even or an odd number of segments. A division of the ring into an odd number of segments, that is to say for example into three, five or seven segments, proves to be particularly advantageous.

The individual segments of the ring are connected to one another. Here, it proves to be particularly advantageous if the segments are connected via webs. The webs have a smaller thickness than the other ring segments.

As a result of the segmenting according to the invention of a cardanic ring, the force to be detected is directed through the measurement body via multiple measurement points. The force to be measured is thereby divided. If the ring is divided for example into five segments which are each connected to one another via webs, then the force is divided between five measurement elements. Therefore, it is also the case that each measurement element has to be able to absorb only one fifth of the total force. In mechanical terms, the ring may be regarded here as a parallel connection of five springs. By way of the number of measurement points, it is possible to influence the maximum transmissible force.

The ring preferably has multiple sensors. Here, the sensors are preferably arranged at the connection points between the individual segments. In a particularly expedient embodiment of the invention, use is made of strain sensors. For example, strain gages may be used. They change their electrical resistance even for small deformations. Said strain gages may be attached to the webs, for example using a special adhesive. The webs are deformed under load. This deformation then leads to a change in the resistance of the strain gage. It is also possible for use to be made of foil strain gages, which have a measurement grid foil made from a resistance wire.

For introducing the forces, the ring preferably has projections. Said projections may for example be in the form of ribs. The ribs are offset from one another by a specific distance. The force to be measured is introduced into the measurement body, or dissipated from the measurement body, via the ribs. The projections are preferably arranged on the front and/or on the rear face side of the ring. Here, it proves to be particularly expedient if the projections are placed at the beginning and at the end of a respective segment.

The force to be measured is introduced into the ring via the projections. This brings about a design of the web to which the sensor, for example a strain gage, is attached. Through the selection of the distance between the projections, it is possible to influence the characteristic values, that is to say for example the maximum force to be transmitted. Furthermore, the characteristic values, for example the maximum force to be transmitted, may be varied through the formation of grooves with various depths and widths. The grooves are preferably formed in the face sides of the ring. They may be placed on the force-introducing side and/or on the force-dissipating side. It is possible to influence the characteristic values, for example the maximum force to be transmitted, via the web height too. This has the result that, with constant structural height, different characteristic values and thus different measurement ranges can be realized.

For the evaluation of the signals from the sensors, for example from the strain gages, a unit, for example a control and regulation unit or an evaluation unit, may be used. This evaluation unit may also be an evaluation unit for full-bridge strain gages. The construction according to the invention is characterized by an extremely small structural height. It is thereby possible to realize a compact centrifugal pump which requires only a small structural space. Moreover, the configuration according to the invention reliably detects all faults which can occur and at the same time ensures optimum compensation of the axial thrust, wherein the main axial thrust is absorbed by the relief device and the residual axial thrust is directed via the ring-shaped body to the axial bearing.

The construction according to the invention also allows a large variation in the measurement range, and with constant structural height. The variation can be realized in different ways. For example, via the number of measurement points. The measurement range can furthermore be influenced via the distances between the projections and via the height of the web between the connections between the segments. Large distances or a small web height are expedient for the detection of small forces. Small distances between the projections or a large web height are suitable in particular for the measurement of large forces. Moreover, grooves may be formed. The formation of grooves in at least one face side of the ring proves to be expedient for the detection of small forces. If the intention is for large forces to be absorbed, the grooves may also be dispensed with.

The connecting elements between the segments, that is to say the webs, make possible precise measurement owing to a very homogeneous stress field, which is favorable for precise measurement with strain gages.

The relief device of the arrangement is preferably designed in such a way that, in all the operating states, a residual thrust acting in the direction of the suction side of the centrifugal pump occurs. Here, the preferably circular ring is dimensioned in such a way that it is deformed elastically by the residual thrust. It proves to be particularly expedient if the spring constant of the ring is such that, starting from a maximum gap width in the rest state of the centrifugal pump, the axial gap is closed under operating conditions to a minimum width at which contact between the surfaces delimiting the axial gap is still avoided. The construction according to the invention may be used for example in the case of a relief device having a double piston or multistage piston. Said construction may also be used in the case of relief disks. It proves to be particularly expedient if a hydrodynamic bearing is used. Further features and advantages of the invention emerge from the description of exemplary embodiments on the basis of drawings and from the drawings themselves.

Figure 2:
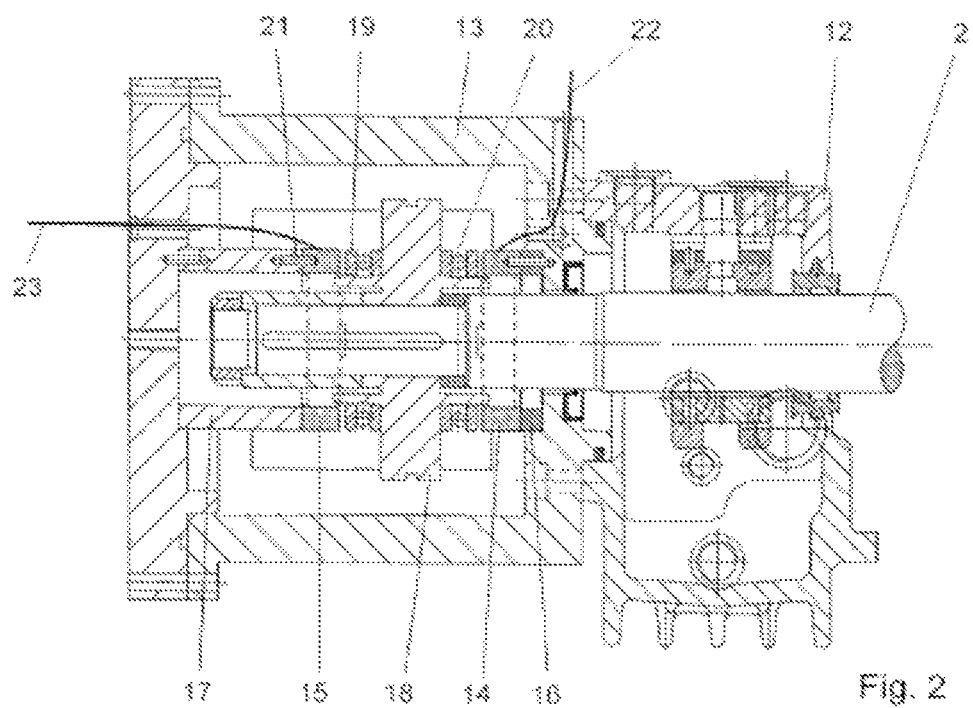
Figure 3:
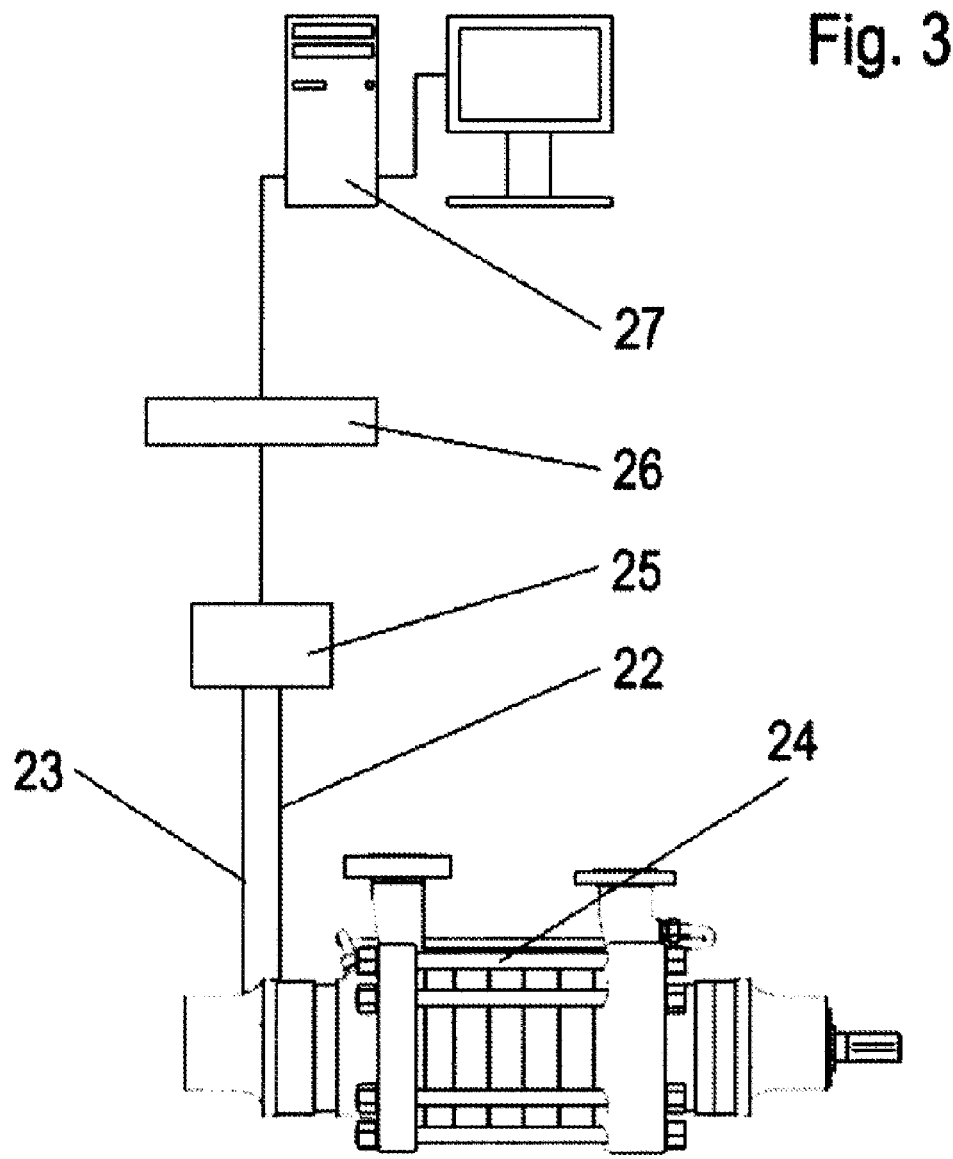
Figure 4:
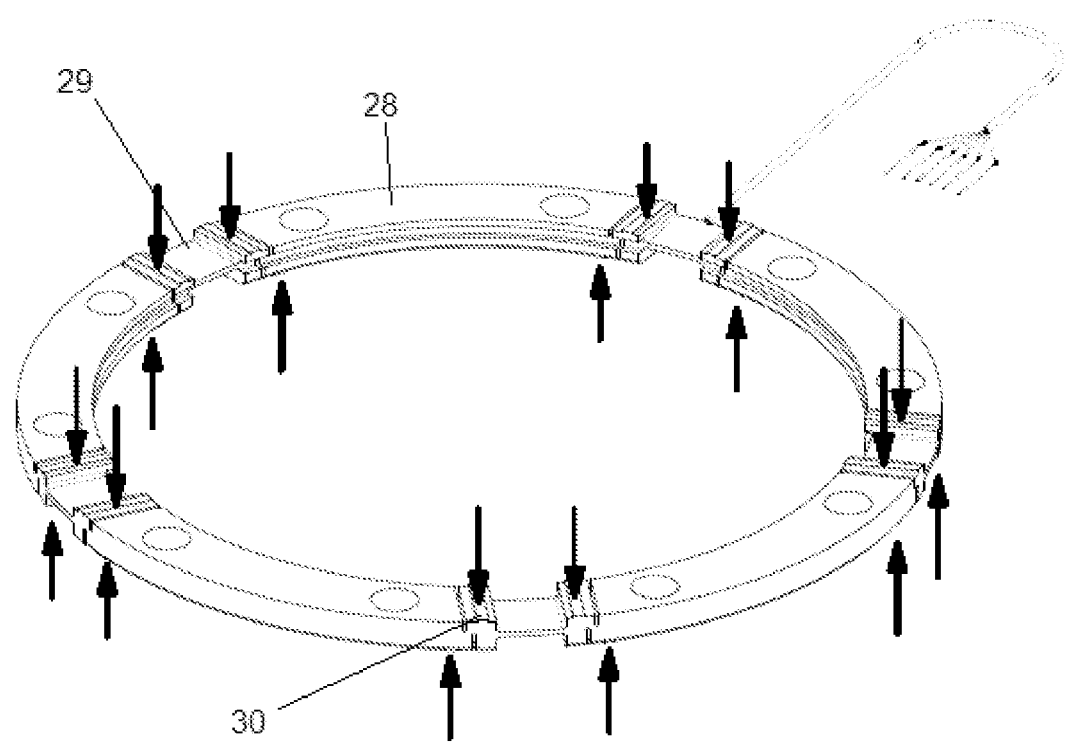
Figure 5:
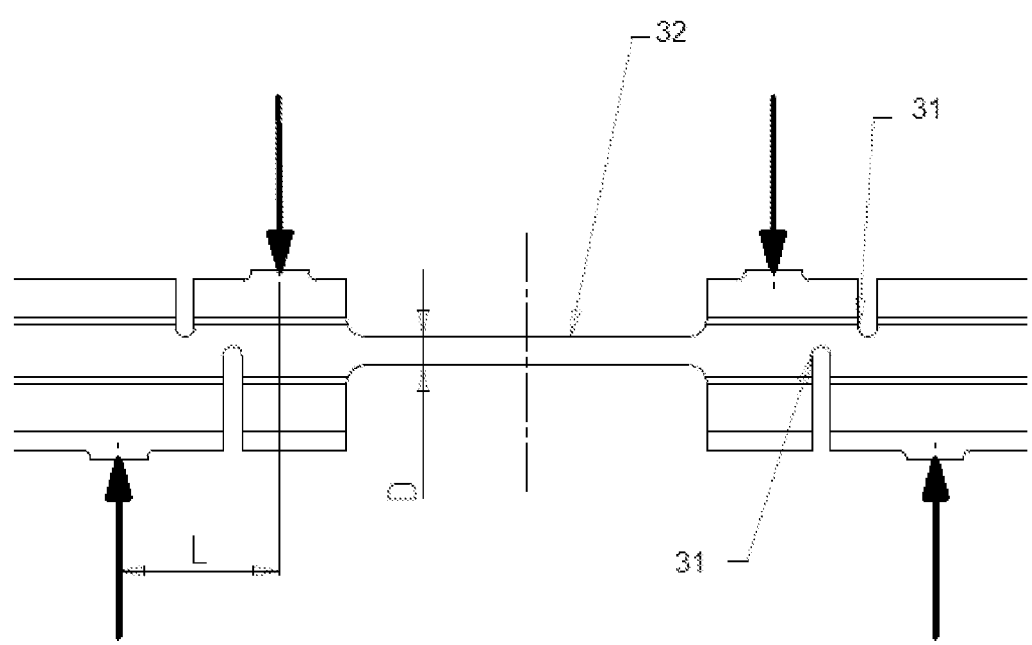

In the drawings:

FIG. 1 shows a detail of a multistage centrifugal pump illustrated in section, FIG. 2 shows a detail of a centrifugal pump with a cardanic ring arranged on the suction side and pressure side, FIG. 3 shows a schematic illustration of a centrifugal pump with a device for processing signals, FIG. 4 shows a perspective illustration of the ring according to the invention, FIG. 5 shows a side view of the ring according to the invention.

FIG. 1 shows a centrifugal pump in which a shaft 2 is mounted in a casing 1.

The shaft 2 carries multiple impellers 3. The drawing as per FIG. 1 illustrates two impellers 3 by way of example.

A double piston 4 of a relief device is fastened on the shaft 2. The double piston 4 is surrounded by a casing part 5. Two radial gaps 6 and 7 are formed between the double piston 4 and the casing part 5. An axial gap 8 is situated between the radial gaps 6 and 7. The axial gap 8 has a variable width s.

At the pressure-side end of the centrifugal pump, the shaft 2 is received by a hydrodynamic axial bearing 9. The axial bearing 9 is assigned a ring 10. The ring 10 is in the form of a cardanic ring. The ring 10 serves for example for compensation of alignment errors which occur during the assembly of a multistage centrifugal pump. The ring 10 is preferably dimensioned in such a way that it is deformed elastically by the residual thrust occurring in the centrifugal pump, which residual thrust is directed toward the suction side. Here, the spring constant of the ring 10 is matched to the characteristics of the relief device.

The relief device is designed in such a way that, in all the operating states of the centrifugal pump, a residual thrust acting in the direction of the suction side occurs. Starting from a maximum width s of the axial gap 8 in the rest state of the centrifugal pump, by way of the elastic deformation of the cardanic ring 10, the gap 8 is closed under operating conditions to a minimum width at which contact between those surfaces of the double piston 4 and of the casing part 5 which delimit the gap 8 is still avoided. The axial gap 8 has a self-regulating function for the relief device.

By integration of the ring 10 into a suitable measuring apparatus, early detection of forces indicating impermissible hydraulic conditions or bearing wear becomes possible. The deformations of the ring 10 that occurred during pump operation are detected by means of sensors and are transmitted as a signal via a line 11 to a device for signal processing. The direct mechanical coupling of the ring 10, acting as an axial force transducer, to the measuring system makes it possible for signals to be measured without the damping influence of a fluid film which, in the case of contactless transducers, is at all times situated between sensor and component.

FIG. 2 illustrates a variant of an axial force measuring apparatus by way of example. Such an apparatus may be attached for example to the pressure-side bearing carrier 12 of a high-pressure ring-section pump. The individual components of the measuring apparatus are accommodated by a cylindrical casing 13. In the variant illustrated in FIG. 2, two rings 14, 15 are used.

In this variant of the invention allows the measurement of axial forces in both directions of action. For the purpose of stabilizing the rotodynamic behavior, the cardanic rings 14, 15 can optionally be prestressed. This occurs via a spacer ring 16 at the suction-side ring 14 and via a spacer bush 17 at the pressure-side ring 15.

The introduction of force into the apparatus is realized, starting from the pump rotor, via an axial plate 18 which is connected rotationally conjointly to the shaft 2. The axial plate 18, according to the direction of action of the axial thrust, transmits the force to one of two axial grooved ball bearings 19, 20, which are coupled directly to the cardanic rings 14, 15. The cardanic rings 14, 15 are subjected to bending stress and thus constitute spring elements in a force-fit chain. Unbalanced residual forces are passed on via a spacer ring 16 or a spacer bush 17 into the casing. The cardanic rings 14, 15 are secured against rotation by in each case one cylinder pin 21. The deformation state is transmitted via lines 22 and 23 to a device for signal processing.

FIG. 3 schematically illustrates the signal processing of measurement signals recorded via the cardanic rings 14, 15 at a high-pressure ring-section pump 24. The first link in the axial force measurement chain is constituted by the cardanic rings 14, 15, to which strain gages (not illustrated in FIG. 3) are applied. As already indicated, for each direction of loading, one ring 14 or 15 is provided. Installed on each ring 14, 15 are two full-bridge strain gages (not illustrated in FIG. 3), whose input and output signals are switched in parallel. Through feeding with a constant voltage via a measurement amplifier and with identical characteristic values of the strain gages used in the bridges, the circuit forms the electrical mean value of the two bridge output signals. In this way, the non-uniform stress distributions caused by possible eccentric introduction of force into the rings are compensated.

The output signal is passed via a strain gage amplifier 25 on to a measurement value converter 26. This converts the signal into an output voltage of 0-10 V. The signal is subsequently passed to a data acquisition board of a computer 27, whereby the display and further processing of the recorded measurement data is possible.

The apparatus illustrated in FIG. 3 is to be regarded as a test setup. For practical operation, it is mostly possible for the elements used to be integrated into the centrifugal pump 24. It is also possible for individual elements, for example the pressure-side ring 15, to be dispensed with in practical use, where appropriate. Also, a hydrodynamic axial bearing may be used instead of two axial grooved ball bearings 19, 20.

FIG. 4 shows by way of example a ring as is used for example in FIG. 1 as ring 10 or in FIG. 2 as ring 14 and ring 15. The ring is divided into a total of five segments 28. The five circle segments 28 are connected to elements 29 which, in the exemplary embodiment, are in the form of webs. The height of the webs 29 is significantly less than the height of the circle segments 28. Each circle segment has projections 30 on both face sides. On one side, the individual segments 28 are delimited by the projections 30. On the opposite face side, the projections 30 are arranged slightly set back into the individual segments.

FIG. 5 shows a lateral view of a ring. The projections 30 are arranged offset from one another by a distance L between one face side and the opposite face side. Moreover, in the illustration as per FIG. 5, it can be seen that the segments 28 of the ring are provided with grooves 31. Sensors 32 are arranged on the elements 29 connecting the circle segments 30 and, in the exemplary embodiment, are in the form of strain gages.

What is claimed is:

1. An arrangement for absorbing axial thrust of a centrifugal pump having a relief device and an axial bearing, comprising:
a ring configured to be arranged at the axial bearing, wherein
the ring is divided into segments,
the ring includes projections on one or both of surfaces of the ring facing in an axial direction which is parallel to a rotation axis of the axial bearing,
adjacent segments are connected in a circumferential direction of the ring by webs having a smaller thickness in an axial direction than an axial thickness of the segments, and
the projections are arranged a predetermined distance from one another on the segments in regions adjacent to the webs.

2. The arrangement as claimed in claim 1, wherein the ring has sensors in the form of strain gages.

3. The arrangement as claimed in claim 2, wherein the ring includes grooves between a radially inner side of the ring and a radially outer side of the ring.

4. The arrangement as claimed in claim 3, wherein
the relief device is configured such that a residual thrust acting on the ring is in a direction of a suction side of the centrifugal pump in all operating conditions.

5. The arrangement as claimed in claim 4, wherein
the ring is configured to be elastically deformed by the residual thrust.

6. The arrangement as claimed in claim 5, wherein
the ring is dimensioned such that, starting from a maximum gap width in a rest state, an axial gap between a double piston and a casing part of the relief device under operating conditions is a minimum width which prevents contact between axially facing surfaces of the double piston and the casing part.

7. The arrangement as claimed in claim 6, wherein
the axial bearing is a hydrodynamic bearing.

8. The arrangement as claimed in claim 7, wherein
the relief device is a relief disk.

* * * * *